United States Patent [19]

Schmager

[11] Patent Number: 5,725,328
[45] Date of Patent: Mar. 10, 1998

[54] SYSTEM AND PROCESS FOR RELINING SEWERAGE PIPE SECTIONS

[75] Inventor: Klaus-Dieter Schmager, Winterscheid, Germany

[73] Assignee: HT Troplast AG, Troisdorf, Germany

[21] Appl. No.: 318,811

[22] PCT Filed: Apr. 21, 1993

[86] PCT No.: PCT/EP93/00974

§ 371 Date: Oct. 19, 1994

§ 102(e) Date: Oct. 19, 1994

[87] PCT Pub. No.: WO93/21399

PCT Pub. Date: Oct. 28, 1993

[30] Foreign Application Priority Data

Apr. 21, 1992 [DE] Germany .................. 42 13 068.9

[51] Int. Cl.⁶ .................. F16L 55/16; F16L 1/00
[52] U.S. Cl. .................. 405/151; 405/146; 405/150.1; 405/154; 405/156
[58] Field of Search .................. 405/154, 146, 405/156, 155, 184, 151, 150.1; 138/97

[56] References Cited

U.S. PATENT DOCUMENTS

| | | | |
|---|---|---|---|
| 4,770,562 | 9/1988 | Muller et al. | 405/154 |
| 5,145,281 | 9/1992 | Molyneux | 405/154 |
| 5,190,705 | 3/1993 | Corazza | 405/154 X |
| 5,427,154 | 6/1995 | Stephens | 405/154 X |

FOREIGN PATENT DOCUMENTS

| | | |
|---|---|---|
| 0 060 134 | 9/1982 | European Pat. Off. . |
| 90 12.003.5 | 1/1991 | Germany . |
| WO 88/03598 | 5/1988 | WIPO . |
| WO 89/04435 | 5/1989 | WIPO . |

*Primary Examiner*—Dennis L. Taylor
*Attorney, Agent, or Firm*—Millen, White, Zelano, & Branigan, P.C.

[57] ABSTRACT

A system for and process of relining transport lines such as sewerage pipelines having an inner tubular thermoplastic inliner, a tubular thermoplastic preliner disposed within the pipeline to be restored. The inner inliner being disposed concentrically and internally of the preliner and having on its exterior means to fix a defined annular space between the inner inliner and the preliner and for anchoring the inner inliner positively in a hardenable composition to be introduced in the annular space between the inner inliner and the preliner.

17 Claims, 5 Drawing Sheets

SYSTEM AND PROCESS FOR RELINING SEWERAGE PIPE SECTIONS

TECHNICAL FIELD

The invention relates to a system and a process for relining transportation pipelines, such as sewerage pipelines or pipe sections.

Relining is a process for restoring damaged, generally underground transportation lines by introduction of a new internal pipeline conduit or the like into the damaged existing line.

BACKGROUND ART

In a known relining process, a long pipeline conduit of pipes of plastic, for example of polyethylene, welded together is pushed into the damaged sewer section. Since the pipes are not very flexible, relatively large excavations are required for this.

In the case of so-called short pipe relining, short pipes of plastic of about 0.5 to not more than 1 m in length are fitted into standard existing manholes and pushed or drawn from this existing manhole into the sewer section to be restored (DE-A 34 13 294).

Because of the large number of pipe connections, these pipes are as a rule not reliably impervious to exfiltration and, in the case of adjacent ground water (entry of water from outside) to infiltration. Furthermore, the relatively rigid pipes of plastic can be employed only if the damaged sewer section has a largely constant internal diameter.

It has already been proposed (DE-A 27 04 438) to restore sewerage pipes by inserting a flexible pipeline inside the discharge pipe, the external diameter of the flexible pipeline being smaller than the internal diameter of the discharge pipe and the flexible pipeline being positioned with a distance from the discharge pipe to form an annular space. In this process, this annular space is filled with a hardenable filling composition of low viscosity, magnesium cement, for example, being used as the filling composition. An essential disadvantage of this process is that centering of the inliner with respect to the pipe to be restored cannot be achieved or can be achieved only with great effort. In the case of water pressure acting externally, there is furthermore the risk of denting of the new pipeline.

To avoid these disadvantages, DE-A1 39 30 984 proposes a process in which a lining tube (inliner) of flexible PVC is used which has, on its outside, a thick-threaded layer of random fiber of polyamide as a spacer. A fast-hardening mortar (so-called dammer) is introduced into the annular space kept free between the sewerage pipe to be restored and the actual inliner by the layer of random fiber and is hardened. A similar process is proposed in DE-A1 39 34 980, HDPE (high density polyethylene) also being proposed as the material for the inliner.

However, flexible PVC has a deficient resistance to chemicals for many application purposes. Finally, the production tion of this two-layered inliner (actual inliner and layer of random fiber) is expensive and is practically impossible in the case of many material combinations.

A process for relining waste water sewers in which a continuous rigid HDPE pipe is folded during manufacture to a U-shaped cross-section, with severe heating, and this deformed cross-section is fixed with tapes is disclosed in the "reprint from bbr 5/90; U-Liners; Protokoll einer Sanierung, Imbema Rohrsanierungs GmbH". This structure, which is still quite rigid, is then drawn into the sewer and heated with steam under increased pressure (about 1.3 bar) to the thermoplastic state, the HDPE pipe assuming its original circular cross-section again. This process is characterized by a high expenditure and a high consumption of energy.

Finally, a nubbed sealing web for relining waste water pipes is disclosed in DE-U 90 12 003, WO 91/10862 and the company brochure "Steuler Umwelttechnik, Bekaplast für Kanalrohre, [Bekaplastfor Sewerage Pipes], 1989". However, this rigid inliner of HDPE can be used only for subsequent restoration of walk-in sewerage pipes of relatively large diameter.

DE-C 23 62 784 discloses a system in which a non-woven tube coated with plastic on one side is impregnated with resin and hardener beforehand such that, after introduction by the inversion process into the pipeline to be restored and after pressing against the pipe wall by means of water pressure, it hardens as a result of heating of the system and is thus a new line system with a rigid pipe wall. Since the resin/hardener system in the carrier non-woven has only a limited processing time (pot life), the impregnation, the transportation to the construction site (if necessary in refrigerated wagons) and the introduction must take place within a relatively short period of time. This system with resin-impregnated non-woven is an adaptable solution for restoration of an entire pipeline conduit. Disadvantages are the risk of inclusions of air during inversion, the expenditure for the relatively short time interval between resin impregnation of the non-woven and hardening in the pipeline conduit to be restored, and the relatively long heating up.

Furthermore, this process can be used satisfactorily only for pipes to be restored which do not have relatively large cracks or erosions, since the resin could emerge through these before hardening, or since otherwise the new flow channels would have irregularities which were too large. In a similar process (EP-A1 0 260 341), this disadvantage is avoided by first drawing an outer resin-impregnated non-woven tube into the sewer to be restored, after which an inner, similarly resin-impregnated calibrating tube is introduced into the outer non-woven tube by the inversion process. After hardening of the resin, a rigid new pipe is formed which is no longer connected to the old pipe to be restored. However, this process requires great effort and is very expensive because of the use of two resin-impregnated non-woven tubes.

In spite of the large number of proposed solutions for relining defective sewerage pipes, there has been to date a lack of a convincing system and process which

- requires no additional earth work, i.e. utilizes existing manhole constructions,
- can be employed even if the old sewerage pipe is severely damaged and also on non-circular sewer cross-sections,
- is achieved without high expenditure and energy consumption during laying,
- leads, without a large reduction in the flow cross-section, to an inliner pipe which is highly resistant to mechanical and chemical stresses and which
- is absolutely impervious to infiltration and exfiltration and in particular complies with the imperviousness requirements according to DIN 4033 for pipelines of plastic,
- and can be employed for all pipe diameters without additional expenditure.

OBJECT

The object of the invention is to provide a system and a process which meets these requirements.

Another object of the invention is to allow the inliner to be controlled more easily. Finally, it is a further object of the invention to simplify later repair of the inliner in the event of damage.

DISCLOSURE OF INVENTION

The invention achieves this object by a system for relining transportation lines with an inner tubular thermoplastic inliner, a second tubular thermoplastic inliner (preliner), which is introduced into the sewerage pipeline to be restored, the inner inliner being introduced into the second inliner (preliner) and having on its outside means, for example nubs, which serve both to fix a defined distance (annular space) between the inner and the second inliner and to anchor the inner inliner positively in a hardenable composition, for example mortar, to be introduced in the annular space between the inner and the second inliner.

In the simplest case, a tube of thermoplastic material which is smooth on both sides can be employed as the preliner.

The inner tubular thermoplastic inliner preferably has a wall thickness of 1.5 to 5 mm, it also being possible to use larger wall thicknesses for sewers to be restored which have a relatively large nominal diameter (ND, for example, >1000 mm). Correspondingly, smaller wall thicknesses can be chosen for small diameters of the sewers to be restored (ND, for example, 150 mm).

The actual (inner) inliner has on its outside spacers which can be constructed, for example, in the form of undercut ribs or a thick-threaded layer of random fiber in accordance with DE-A1 39 30 984. However, the inliner is preferably set on its later outside with a large number of nubs which preferably have a diameter of 5 to 15 mm and a length of 8 to 20 mm and have a larger diameter at the top end than at the foot in order to achieve undercutting. These nub forms are known in principle. The separation of the individual nubs from one another is about 1.5 to 4 cm, so that there are about 500 to 5000 nubs per 1 m$^2$.

The nubs serve on the one hand as spacers for the preliner, so that an annular space is maintained between the preliner and the actual inliner after introduction of the inliner into the preliner. The individual nubs then project into this annular space. The annular space is filled with a hardenable composition, for example a synthetic resin. The composition is then hardened. A liquid mortar (dammer) is preferably used as the hardenable composition.

After this annular space has been filled and hardened with, for example, a mortar, the nubs, with their undercuts, at the same time form anchoring elements which fix the inliner to the hardened mortar. The hardened mortar (dammer) forms a rigid (new) pipe which is insulated from the outside by the preliner and lined on the inside with the inliner.

In the event of any later damage to the preliner and in the event of invasion of water from the outside (ground water), it must be expected that water will get between the hardened mortar layer and the inner inliner. Nevertheless, the relatively flexible inliner is not thereby pressed in, that is to say it does not dent, since the nubs are held by the hardened mortar. Depending on the nub geometry, external pressures of up to 3 bar can be withstood before the nubs are drawn out of the pipe shell.

In a preferred embodiment of the invention, a third (outer) tubular thermoplastic inliner is provided between the second tubular thermoplastic inliner (preliner, middle inliner) and the transportation line to be restored (sewerage pipeline), the third (outer) inliner having on its inside or the second (middle) inliner (preliner) having on its outside means, for example nubs, for fixing a distance between the second (middle) inliner and the third (outer) inliner, a free annular space being formed between the second and the third inliner as a control space for detecting and if appropriate eliminating leaks in one of the inliners (three-shell system).

The nubs on the outside of the middle inliner or on the inside of the outer inliner (third inliner) are preferably 0.5 to 2 mm thick, with a diameter of about 3 to 30 mm and an average separation of 3 to 40 mm. The dimensions of these nubs are not critical, since they serve merely to maintain a free flow cross-section.

According to another preferred embodiment of the invention, a metal foil, for example of aluminum, is embedded in one of the inliners used (outer inliner, middle inliner, inner inliner). This barrier foil serves as a reliable barrier against permeation or diffusion of chlorinated hydrocarbons and the like, which may penetrate the thermoplastic material of the inliners. The barrier foil is preferably integrated into the preliner in a two-shell construction (preliner and inner inliner) and into the middle inliner in the three-shell construction (outer, middle and inner inliner).

HDPE (high density polyethylene) and/or VLDPE (very low density polyethylene; $\rho$ less than 0.915 g/cm$^3$, preferably $\rho$ less than 0.905 g/cm$^3$) is preferably employed as the thermoplastic for the inliners used, the E modulus (hardness) of the material according to DIN 53 457 (measurement of the tangent gradient (modulus) at 0.5% elongation, rate of elongation 1%/minute, temperature 23° C.) preferably being 30 to 900 N/mm$^2$, in particular 100 to 600 N/mm$^2$.

Preferably, however, it is not pure VLDPE but a mixture with up to 75% by weight of HDPE which is employed. This considerably increases the mechanical strength without greatly impairing flexibility.

The use of an HDPE (high density polyethylene; $0.93 < \rho < 0.95$ g/cm$^3$) of low E modulus according to DIN 53 457 in the range up to 900 N/mm$^2$, preferably up to 600 N/mm$^2$, has proved to be particularly appropriate. Mixtures of 30 to 70% by weight of VLDPE and 70 to 30% by weight of HDPE are particularly preferred, the E modulus according to DIN 53 457 of the mixture being preferably 50 to 500 N/mm$^2$, in particular 150 to 300 N/mm$^2$ at an average nominal diameter of the inliner. The secant modulus of the material (secant gradient in the range from 1% to 2% elongation in the stress/strain diagram, measured in accordance with DIN 53 457/ISO 527, rate of elongation 1%/minute, temperature 23° C.) is preferably between 40 and 400 N/mm$^2$, in particular 75 and 230 N/mm$^2$.

A higher flexibility (lower E modulus) should be aimed at for smaller nominal diameters, while a higher E modulus (higher rigidity) is preferred for larger nominal diameters. The ratio of E modulus to nominal diameter should preferably be 0.2 to 2.5 N/mm$^3$, in particular 0.3 to 1.5 N/mm$^3$.

It has been found, surprisingly, that the VLDPE used, and in particular the preferred mixtures of HDPE and VLDPE, have an excellent resistance to chemicals with respect to virtually all the media in question, which is sometimes considerably greater than that of VLDPE.

According to a preferred embodiment of the invention, a light-colored pigment is admixed to the thermoplastic for the inner inliner in order to obtain an inliner with a light color. The so-called L value is determined on a matted sample according to DIN 5033, Part 4 (spectral method, light type C, 2° observation angle, geometry 0°/45°) as a measure of the "degree of lightness" or "global degree of reflection". An L value of 100 means that 100% of the incident light is (diffusely) reflected (ideal white). The inliner according to the invention accordingly preferably has a global degree of reflection of >30%, preferably >60%, (L value>30 or, respectively, > than 60). This considerably facilitates later control of the restored sewer with a video camera.

According to an alternative embodiment of the invention, no colored pigment and no carbon black is admixed to the thermoplastic for the inner inliner, in order to obtain a transparent or translucent inliner. The proportion of perpendicularly incident light (380–780 nm) which penetrates through the sample (including the scattered proportion) is determined as a measure of the "global transparency to light". The global transparency to light of the inliner according to this embodiment of the invention is >30%, preferably >50%. This allows later control of the mortar surrounding the inliner, for example for the presence of relatively large voids, air bubbles or cracks.

To produce the tubular inliners according to the invention, a web of corresponding thermoplastic is shaped to a tube in a manner which is known per se, a side strip of, for example, 3 to 10 cm width, preferably about 4.5 cm width, being overlapped by the other side strip parallel to this. The side strips are welded by heat—preferably with a double seam—in the overlapping region. The test channel formed between the double seams serves to test the imperviousness of the weld seam.

A nubbed web—of other materials and known per se—of - preferably flexible-thermoplastic material is used to produce the homogeneous inliner set with nubs, a side strip of, for example, 3 to 10 cm width, preferably about 4.5 cm width, which is not set with nubs being overlapped by the other side strip parallel to this. The side strips are welded by heat - preferably with a double seam—in the overlapping region. The weld seam here runs approximately parallel to the longitudinal axis of the inliner.

It is particularly advantageous if at least one row of hubs is arranged between the two seams in the region of the double seam. The number of nubs (spacers or anchoring elements) per $m^2$ in the region of the seam should approximately correspond to that in the region of the remaining web. For this, the nubs are arranged in rows parallel to one another and to the longitudinal extension of the web, which are displaced with respect to one another if appropriate, an intermediate space of about 0.5 to 2 cm sufficiently wide for a weld seam remaining between two adjacent rows of hubs. If appropriate, several hubbed webs can also be joined to one another to give an inliner of larger diameter for a relatively large diameter of the pipe to be restored.

By these processes, the inliners can be virtually tailor-made for various sewer diameters as required.

Because of their high flexibility, the inliners according to the invention can in principle be introduced by the so-called inversion process into the sewer section to be restored. Preferably, however, the inliners are drawn from one manhole (standard manhole construction), which is generally already present, to the next existing manhole, it also being possible for intermediate manhole to be bridged. For this, the inliner can be folded approximately U- or S-shaped and also drawn loosely over relatively small radii of curvature.

Preferably, the inliners prefabricated at the factory are elevated on a drum at the manhole construction. The inliner is folded approximately U-shaped during the drawing-in operation by a deforming unit positioned over the access opening, so that a reduction in cross-section of about 50% with a corresponding loss in rigidity results compared with the original state. This allows the inliner to be deflected by 90° conveniently within the manhole construction, for example with the aid of a PE pipe bend which has been introduced, and to be introduced into the sewer pound. The individual inliners are now likewise drawn over a deflection device from the particular end manhole of the pound to be restored.

It is of particular advantage here that the inliners do not have to be heated before being drawn into the sewer pipeline, that is to say they can be introduced at ambient temperature.

In the embodiment with two inliners (two-shell system), that is to say without a control space, in this process the outer inliner (preliner) is first drawn into the sewer to be restored. The inner inliner provided with nubs on its outside is then drawn into the preliner (outer inliner).

In the embodiment with three inliners (three-shell system), that is to say with a control space, the outer inliner is first drawn into the sewer to be restored. If the outer inliner has nubs here, these are arranged on the inside. The middle inliner, if appropriate with the nubs on the outside, is then drawn into the outer inliner, and thereafter the inner inliner provided with nubs on its outside is drawn into the middle inliner.

A two- or three-shell system of inliners, which can of course be supplemented with further layers (inliners) as required, if the associated reduction in cross-section can be accepted, is formed in this manner.

If possible, the weld seam should in each case be located in the apex region of the sewer pipe.

In the embodiment with two inliners (two-shell system), that is to say without a control space, after the two inliners have been drawn in, the annular space between the outer inliner (preliner) and the inner inliner provided with nubs on its outside is filled with, for example, a liquid mortar (dammer). In principle, the mortar can indeed be introduced even while the inner inliner is being drawn into the sewer, but the mortar is preferably first introduced subsequently in a manner which is known per se. The inliners are first fixed and sealed to the internal wall of the sewer to be restored at both ends in the region of the manhole construction. The inner inliner is then charged from within with a fluid (air or, preferably, water) under an increased pressure of 0.2 to 1 bar, preferably about 0.5 bar. The inliners thereby lie against the internal wall of the sewer, a uniform annular space being maintained by the nubs of the inner inliner.

During introduction of mortar, the annular space is filled completely with the liquid mortar. If appropriate, hardening of the mortar can be delayed or accelerated by temperature control of the fluid inside the inliner. By using a high-strength mortar, the filled annular space forms a load-bearing shell and thus at the same time guarantees the statics of the inliner. After a hardening time of only 12 hours, for a nominal width of DN 800 all the stress detections required of a self-supporting lining according to IfBT ("Richtlinie für Auswahl und Anwendung von Innenauskleidungen mit Kunststoffbauteilen für Misch- und Schmutzwasserkanäle, Anforderungen und Prüfungen, 09.82", [Guidelines for selecting and using internal linings with components of plastic for mixed and contaminated water sewers, requirements and testing, 09.82]) and ATV A 127 ("Richtlinie für die statische Berechnung um Entwässerungskanälen und -leitungen", [Guidelines for statics calculation on drainage sewers and lines]) are met.

If particularly high mechanical requirements (statics) are imposed on the restored pipeline, two inner inliners provided with nubs on the outside can also be used, the two annular spaces formed being filled with, for example, mortar.

In the embodiment with three inliners (three-shell system), that is to say with a control space, the annular space between the inner inliner and the middle inliner is filled with mortar in a manner similar to the process described above with the two-shell construction. In this three-shell system, the annular space between the outer inliner and the middle inliner forms a control space, so that after restoration or later, a leakage can be detected by measures which are known per se, such as application of an increased or reduced pressure, suction or collection of liquid which has penetrated into the test space using a thin test tube, measurement of the electrical resistance by a test probe and the like. If appropriate, a leakage thus located can also be sealed in a manner which is known per se by injection of a hardening and/or swellable agent into the control annular space.

According to another embodiment of the invention having at least a three-shell structure, a textile or the like filled with a swellable agent, in particular a so-called geotextile, is located between two outer inliners in order to achieve a self-sealing function. Bentonite, for example, is used as the swellable agent. The thickness of the filled textile is preferably about 3 –5 mm.

The relining system according to the invention combines, to a previously unknown extent, sometimes such contradictory properties as:

high flexibility for easier introduction of the inliner through existing manhole constructions, high resistance to chemicals with respect to aggressive media, absolute imperviousness to exfiltration and infiltration, high intrinsic stability and mechanical strength, for example under mechanical stress from outside (earth movements) and later high pressure water jet cleaning from inside, long operating life, usability also in non-walk-in sewer pipelines, usability also in non-circular sewer cross-sections, in pipe bends and the like and in severely damaged sewers with water invasion from the outside, low energy consumption and low expenditure during laying, small loss in cross-section, protection from encrustation, favorable costs.

In the case of the preferred three-shell system, controllability of imperviousness and restorability furthermore are achieved.

The invention is illustrated in more detail below with the aid of an embodiment example and the drawings.

MODE(S) FOR CARRYING OUT THE INVENTION EMBODIMENTS OF THE INVENTION

EXAMPLE 1

Figure 5:
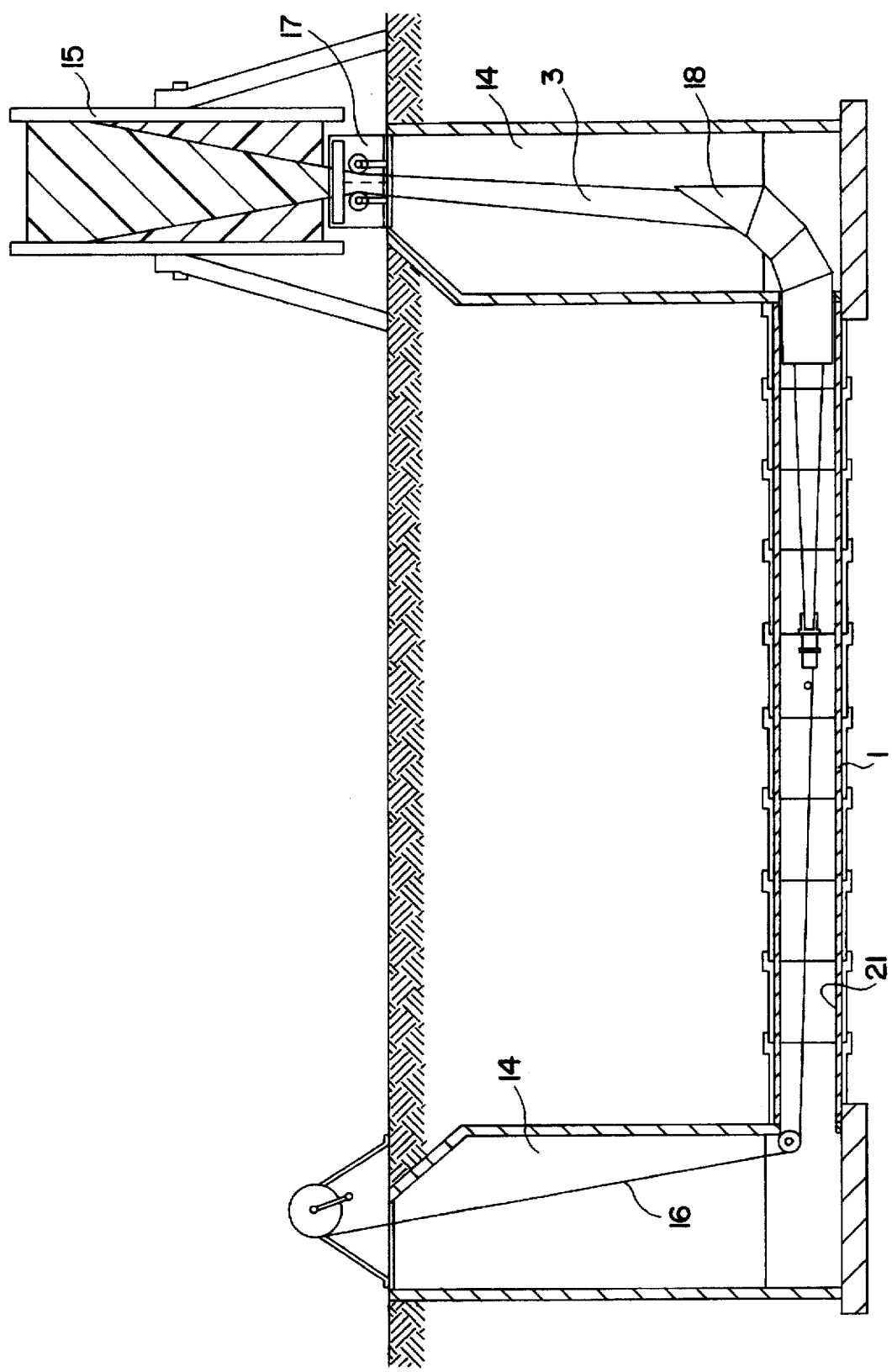
FIG. 5 shows a longitudinal section of a sewer to be restored during drawing in of the inliner.

A sewer 1 of nominal diameter 300 mm (DN 300) is to be restored using the two-shell system (without a control space). The sewer 1 has standard manhole constructions 14 at a separation of in each case 60 m (FIG. 5).

To produce a preliner 3, a batch comprising

72% by weight of VLDPE (Norsoflex® LW 1910; Enichem; E modulus 65 N/mm$^2$)

25% by weight of HDPE (Vestolen® A 3512 Natur; H üls AG; E modulus 590 N/mm$^2$)

2% by weight (White pigment PMM 869, Polyplast M üller)

1% by weight of HDPE (Vestolen® A 3512 R, Hüls AG; contains carbon black)

is homogenized in a single-screw extruder known to the expert and extruded to a flat sheet having a width of about 1 m and a thickness of 2.5 mm. After the web has been trimmed on both sides to a width of 985 mm, it is shaped to the preliner 3 of outer diameter 300 mm in a second working step, a double seam with an intermediate test channel being produced in the overlapping region by welding by heat. The material of the preliner 3 has an E modulus of 150 N/mm$^2$. The ratio of E modulus to nominal diameter ("relative rigidity") is thus 0.5 N/mm$^3$.

The following batch is used to produce the inner in-liner 2:

50% by weight of VLDPE (Norsoflex® LW 1910; Enichem; E modulus 65 N/mm$^2$)

50% by weight of HDPE (Vestolen® A 3512 Natur; H üls AG; E modulus 590 N/mm$^2$).

This batch is homogenized in a single-screw extruder and extruded on a roll mill with a first roll which has slightly conical bores and a second roll. The thermoplastic material is pressed into the slightly conical bores in the roll nip. After the web has been taken off from the roll, a sealing web 13 provided with nubs is obtained. The nubs, with an initial length of 13 mm, are then compressed at the top with a steel roll and a rubber roll with a nip width of 12 mm, so that the individual nubs compressed to a length of about 10 mm have corresponding undercuts 11. In the embodiment example shown, the sealing web 13 is 3 mm thick. The nubs 4 have a length of 10 mm, and a diameter of 5 mm at the foot and 8 mm at the top.

The translucent (opaque) inner inliner 2 with a global transparency to light of 53% has an E modulus of 260 N/mm$^2$, so that a relative rigidity, based on the nominal diameter of 300 mm, of 0.86 N/mm$^3$ results.

The preliner 3 and inner inliner 2 are cut to a length of, for example, 60 m, tested for imperviousness and transported to the building site on a cable drum. Drawing of the preliner 3 into the sewer 1 to be restored is shown in more detail in FIG. 5. The preliner 3 here is drawn into the sewer 1 from the standard manhole construction 14. For this, the preliner 3 is first folded approximately U-shaped with the aid of the device 15 and is threaded into the sewer 1 via the roll guide 17 and the deflection device 18 with the aid of the cable 16.

Figure 4:
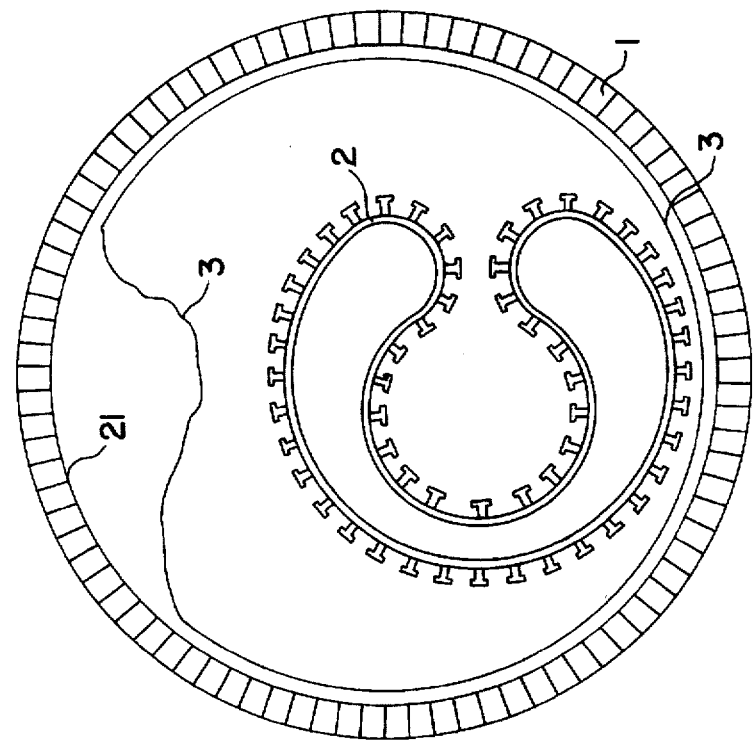
FIG. 4 shows a sewer to be restored with a preliner and inner inliner (cross-section)
Figure 1:
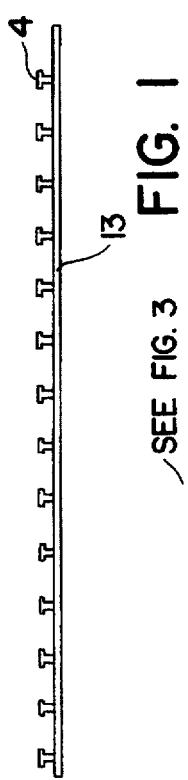
FIG. 1 shows a nubbed web for production of the inner inliner.
Figure 2:
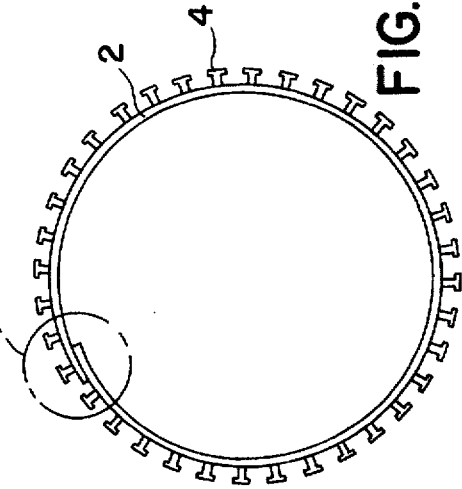
FIG. 2 shows an inner inliner according to the invention.
Figure 3:
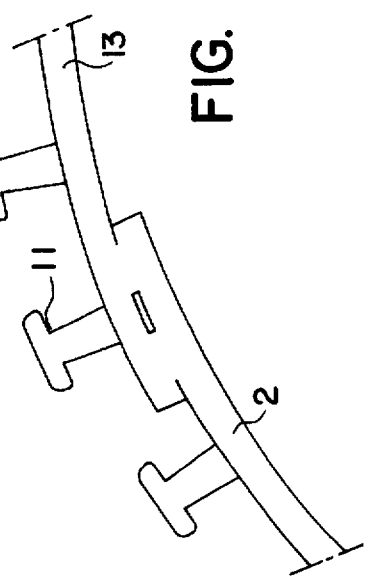
FIG. 3 shows unit X according to FIG. 2 (weld seam)
Figure 6:
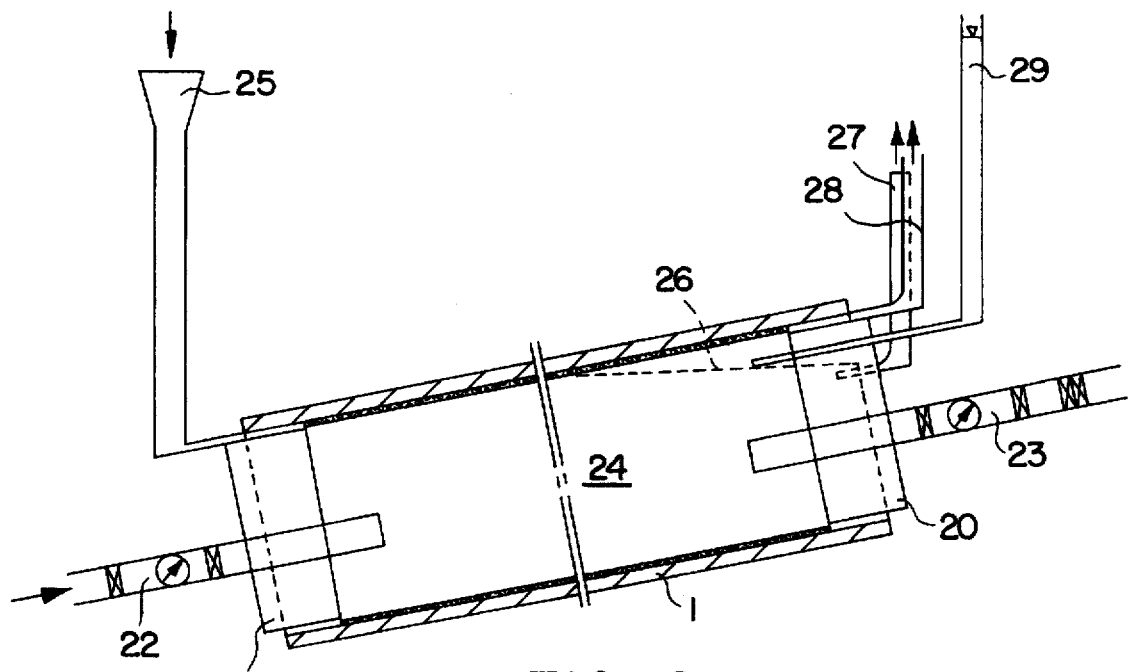
FIG. 6 shows a longitudinal section through a sewer to be restored during filling of the annular space.
Figure 7:
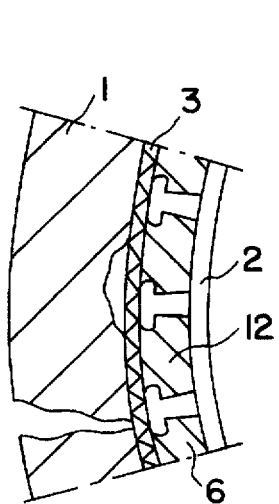
FIG. 7 shows a cross-section through a restored sewer (section of a two-shell system)

After the preliner 3 has been drawn in, the inner inliner 2 is drawn into the preliner 3 in the same manner (FIG. 4). The nubs 4 are then removed over a length of 10 cm at both ends of the inner inliner 2. These nub-free ends 31 of the inliner 2 are pressed onto the sewer inner wall 21 at both ends with the aid of gas bags 19 and 20 and are sealed in this region. Filling openings 22 and discharge openings 23 allow introduction and removal of (if appropriate temperature-controlled) water 24 under a defined pressure. At the same time, a leak can be detected promptly by measuring any drop in pressure. The inner inliner 2 is pressed against the preliner 3 and this is pressed against the inner wall 21 of the sewer 1 by the internal water pressure of about 0.5 bar, the nubs 4 fixing a defined annular space 5 between the sealing web 13 and the preliner 3. A liquid mortar 6 (product HC/HT relining injector, Hüls Troisdorf AG) is introduced into this annular space 5 through the filling hopper 25. In the example shown, the mortar 6 is introduced from the zenith of the lowest point of the sewer pound with a low pressure, the mortar 6 spreading accordingly in the annular space 5 of the slightly ascending sewer 1 by the force of gravity. The mortar level 26 reached momentarily is plotted in FIG. 6. If appropriate, air can escape from the annular space 5 through vent lines 27 and 28, control of the mortar level 26 reached becoming possible at the same time. During introduction of the mortar 6, the internal pressure in the inner inliner 2 can rise under certain circumstances, which can be controlled and compensated with the aid of the overflow 29.

After introduction of the mortar is complete, the mortar 6 hardens within about 7 hours, it being possible for the hardening time to be accelerated or retarded, if appropriate, by a temperature control of the water 24.

After hardening, the mortar 6 forms a rigid, self-supporting pipe which is reliably protected from corrosion on the inside by the inner inliner 2 and on the outside by the preliner 3. The nubs 4 here form an anchoring of the nubbed web in the mortar pipe.

Figure 10:
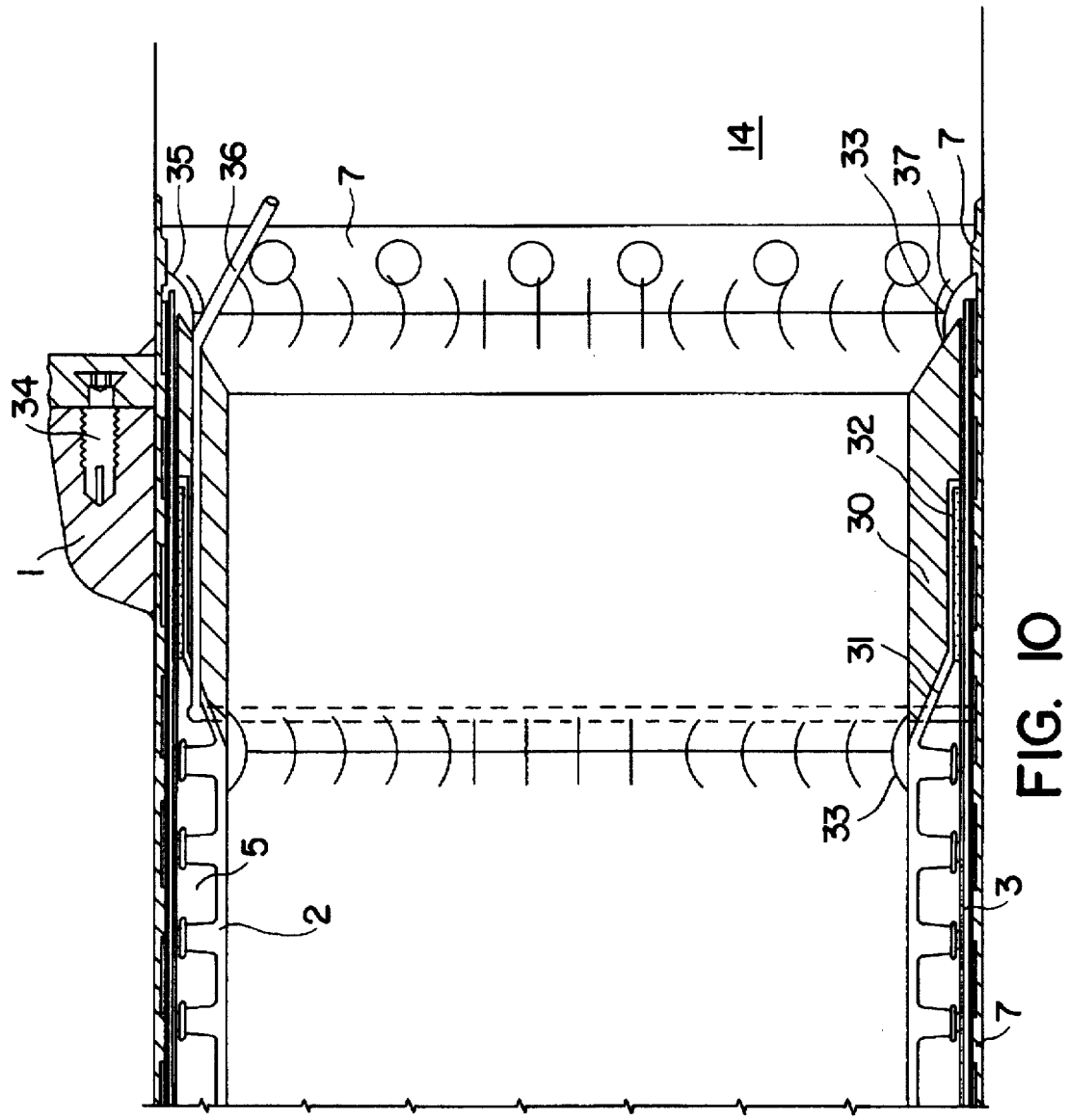
FIG. 10 shows the connection of the inliner to the sewer end (three-shell system).

Finally, the inliner 2 is connected to the manhole construction 14 at both ends, as shown in FIG. 10. For this, a statically self-supporting, rigid ring 30 of HDPE is pushed from the manhole constructions 14 into the sewer end, the nub-free ends 31 of the inliner 2 being clamped between the HDPE ring 30 and the sewer inner wall 21. If appropriate, a seal 32 can also additionally be provided between the outside of the nub-free end 31 of the inliner 2 and the sewer inner wall 21. After introduction of the HDPE rings 30, these are welded to the inliner 2 (weld seam 33). A semicircular-shaped sheet 35 of HDPE, fixed to the upper half of the sewer pipe 1 on the inside from the manhole construction 14 using dowels 34 is finally welded to the ring 30.

By using a virtually transparent inliner 2, reliable TV control of the annular space 5 filled with mortar 6 is possible, so that, for example, relatively large air bubbles can be discovered promptly.

EXAMPLE 2

A sewer 1 of nominal diameter 300 mm (DN 300) is to be restored using a three-shell system with a control space 9. The sewer 1 has manhole constructions 14 at a separation of in each case 60 m.

For this, an outer inliner 7, a middle inliner 3 and an inner inliner 2 are first produced similarly to Example 1. The outer inliner 7 here has small nubs 8 1 mm in height and 8 mm in diameter on its inside. An aluminum foil 10 is integrated as a permeation barrier into the middle inliner 3.

Figure 8:
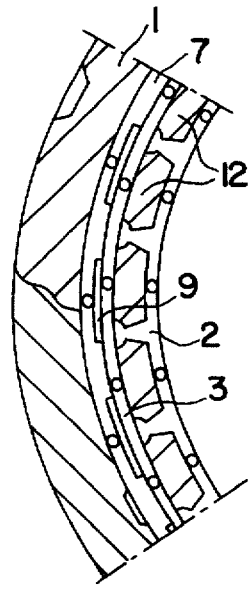
FIG. 8 shows a cross-section through the restored sewer (section of a three-shell system)
Figure 9:
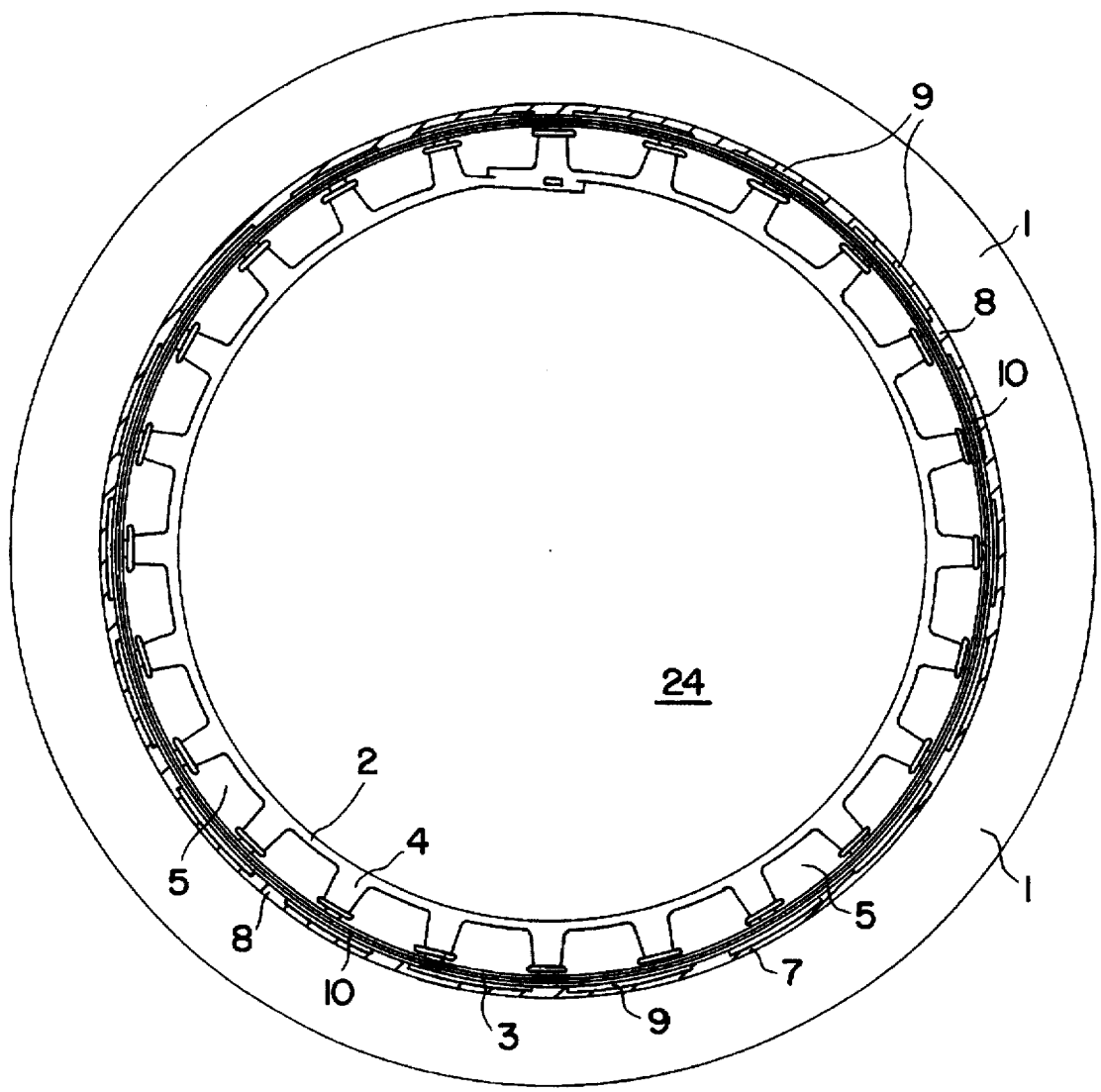
FIG. 9 shows a cross-section through the sewer to be restored before filling of the annular space.

A cross-section of a correspondingly restored pipe is shown in FIG. 8. A control space 9 (outer annular space) is fixed by the nubs 8 between the outer inliner 7 and the middle inliner 3.

At the connection of the system to the manhole constructions 14 according to FIG. 10, a control tube 36 is provided, in addition to Example 1, between the outer inliner 7 and the middle inliner 3. As shown in FIG. 10, the middle inliner 3 is additionally welded to the outer inliner 7 at the inliner end, that is to say at the manhole construction 14 (weld seam 37). A sealing tape 32 of butyl rubber (double-sided adhesive tape) serves as a further seal between the inliner ends 31 and the middle inliner 3.

LEGEND

1 Sewer pipeline, sewer
2 Inner thermoplastic inliner
3 Preliner, middle inliner
4 Nubs
5 Annular space
6 Mortar
7 Third thermoplastic inliner
8 Nubs
9 Annular space, control space
10 Metal foil
11 Undercuts
12 Pipe shell
13 Sealing web
14 Manhole construction
15 Device
16 Cable
17 Roll guide
18 Deflection device
19 Gas bag
20 Gas bag
21 Sewer inner wall
22 Filling opening
23 Discharge opening
24 Water
25 Filling hopper
26 Mortar level
27 Vent line
28 Vent line
29 Overflow
30 Ring
31 Nub-free inliner end
32 Seal
33 Weld seam
34 Dowel
35 HDPE sheet
36 Control tube
37 Weld seam

I claim:

1. A system for relining transportation lines, such as sewerage pipelines (1), comprising:

an inner tubular thermoplastic inliner (2), a tubular thermoplastic preliner (3), disposed, within the sewerage pipeline (1) to be restored, the inner inliner (2) being disposed concentrically and internally of said preliner 3, and having on its exterior means (4) to fix a defined annular space (5) between the inner inliner and the preliner and for anchoring the inner inliner (2) positively in a hardenable composition 6 to be introduced in the annular space (5) between the inner inliner and the preliner.

2. A system as claimed in claim 1, further comprising a second thermoplastic inliner (7) disposed between the thermoplastic preliner (3) and the transport line to be restored (1), the second inliner (7) having on its inside or the preliner (3) having on its outside means (8) for fixing a distance between the preliner and the second inliner, thereby forming a free annular space (9) between the preliner and the second inliner as a control space for detecting and optionally eliminating leaks in one of the inliners.

3. A system as claimed in claim 1, having a metal foil (10) as a diffusion or permeation barrier for chlorinated hydrocarbons in one of the inliners.

4. A system as claimed in claim 1, wherein nubs (8) are provided as a means for fixing a defined distance between the second inliner and the preliner, the nubs (8) having undercuts (11) and being joined integrally with the inner inliner (2).

5. A system as claimed in claim 1, wherein the inner inliner (2) consists essentially of 25 to 100% by weight of VLDPE having an E modulus of 30–300 N/mm$^2$, 0 to 75% by weight of HDPE, 0 to 5% by weight of fillers, pigments or auxiliaries, 0 to 5% by weight of other polymers and the inner inliner (2) has an E modulus of 50–500 N/mm$^2$.

6. A system as claimed in claim 1, which has a ratio of the E modulus to nominal diameter of the inner inliner (2) of 0.25–1 N/mm$^3$.

7. A system as claimed in claim 4, wherein the inner inliner (2) has a wall thickness of 1.5–5 mm, an average nub diameter of 5–15 mm and a nub length of 8–20 mm.

8. A process for relining transportation lines, such as sewer pipelines (1), comprising:

first introducing an outer tubular thermoplastic preliner (3) into the sewer pipeline (1) to be restored;

then introducing an inner tubular thermoplastic inliner (2) into the outer preliner (3), said inner inliner (2) having on its outside nubs (4) for fixing a defined distance (annular space 5) between the inner inliner and the preliner, thereby forming an annular space (5) between the preliner (3) and the inner inliner (2);

then filling the annular space with a hardenable composition;

and then hardening the hardenable composition to a rigid pipe shell (12) in which the nubs (4) are anchored positively.

9. The process as claimed in claim 8, further comprising before introduction of the preliner (3) introducing another tubular thermoplastic inliner (7) into the sewer pipeline (1) to be restored; and said other inliner (7) having on its interior or the preliner (3) having on its exterior nubs (8) for fixing a distance between the preliner (3) and the other thermoplastic inliner (7), whereby a free annular space (9) is formed between the preliner (3) and the other inliner (7) as a control space for detecting and optionally eliminating leaks in one of the inliners.

10. The process as claimed in claim 8, wherein a liquid mortar (6) is employed as the hardenable composition.

11. The process as claimed in claim 9, further comprising providing a material filled with a swellable agent as a self-sealing layer arranged between the preliner (3) and the inliner (7).

12. A process according to claim 9, further comprising monitoring said control space so as to detect any leaks in the inliners.

13. A process according to claim 12, further comprising detecting a leak and the injecting into said annular space a hardening or swellable agent so as to stop said leak.

14. A process according to claim 9, further comprising injecting a swelling agent between the outer two inliners.

15. A process according to claim 14, wherein the swelling agent is bentonite.

16. A system as claimed in claim 2, having a metal foil (10) as a diffusion or permeation barrier for chlorinated hydrocarbons in one of the inliners.

17. A system according to claim 2, further comprising means to measure leaks into said annular space.

* * * * *